United States Patent [19]

Hannecart

[11] 4,117,047

[45] Sep. 26, 1978

[54] DEVICE FOR MIXING GASES AND LIQUIDS

[76] Inventor: Robert Stephan Hannecart, 2, avenue J.Van Boendaele, 1980 Tervuren, Belgium

[21] Appl. No.: 844,406

[22] Filed: Oct. 21, 1977

Related U.S. Application Data

[63] Continuation of Ser. No. 654,349, Feb. 2, 1976, abandoned.

[30] Foreign Application Priority Data

Feb. 3, 1975 [LU] Luxembourg ............................ 71782

[51] Int. Cl.² .............................................. B01F 3/04
[52] U.S. Cl. ...................... 261/91; 210/219; 239/219; 261/29
[58] Field of Search ........................ 261/87, 91, 93, 29, 261/DIG. 75, 36 R, 86; 210/219, 220, 221 R, 221 M; 239/219-221; 209/169, 170; 195/109, 142-144

[56] References Cited

U.S. PATENT DOCUMENTS

| 2,054,395 | 9/1936 | Streander | 261/91 X |
| 2,928,665 | 3/1960 | Epprecht | 261/93 X |
| 3,130,245 | 4/1964 | Banks | 261/91 X |
| 3,218,042 | 11/1965 | Ciabattari et al. | 261/91 X |
| 3,235,233 | 2/1966 | Bolton | 261/91 X |
| 3,355,106 | 11/1967 | Graham | 261/93 X |
| 3,479,017 | 11/1969 | Thikotter | 261/91 |
| 3,490,996 | 1/1970 | Kelley, Jr. | 261/87 X |
| 3,576,316 | 4/1971 | Kaelin | 261/91 |
| 3,735,926 | 5/1973 | Ravitts | 261/91 X |
| 3,933,640 | 1/1976 | Kirk et al. | 261/91 X |

Primary Examiner—Richard L. Chiesa
Attorney, Agent, or Firm—Holman & Stern

[57] ABSTRACT

A device for mixing liquids and gases comprising a fan stage above and connected to a distribution stage. The fan stage comprises a plate with blades and a central aperture. The distribution stage comprises a plate, preferably concave with the concavity facing upwards, having a central aperture which is disposed just above or at the level of the liquid. A motor spins both stages. A pipe may be extended from the aperture of the distribution stage down into the liquid.

14 Claims, 5 Drawing Figures

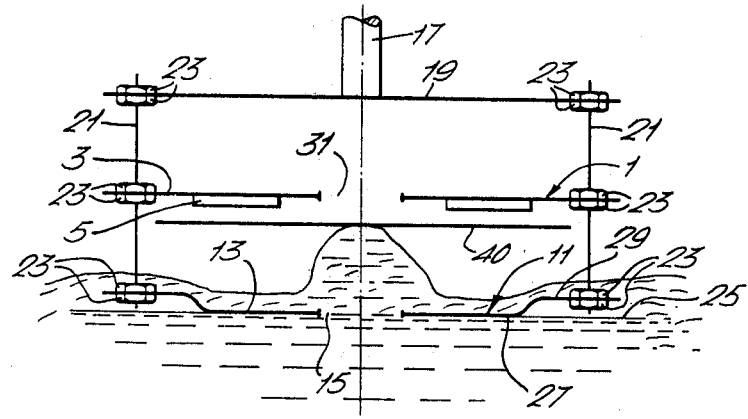
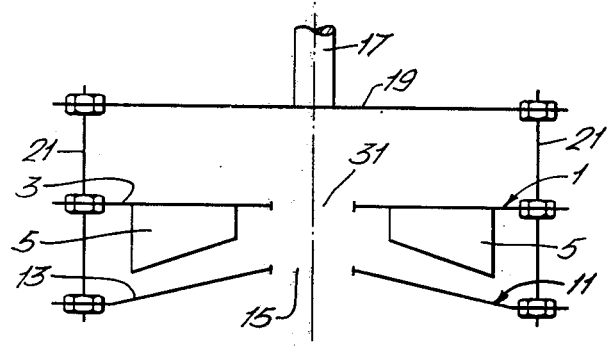
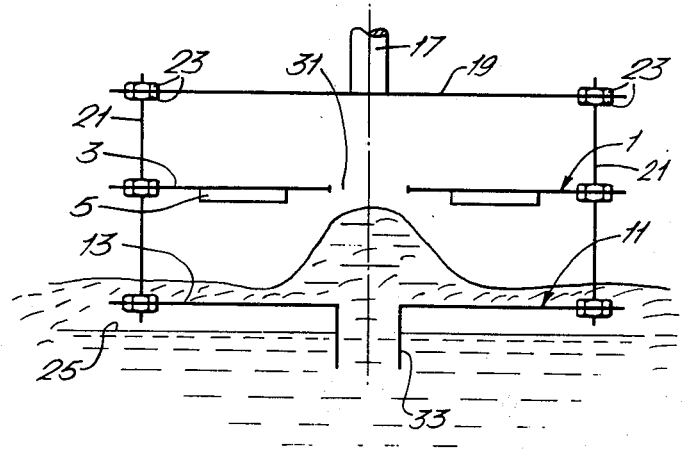

DEVICE FOR MIXING GASES AND LIQUIDS

This is a continuation of application Ser. No. 654,349, filed Feb. 2, 1976, now abandoned

BACKGROUND OF THE INVENTION

The present invention relates to a device enabling mixtures of gases and liquids to be produced. In numerous industrial operations mixtures of gases with liquids are produced in order to absorb the gases in a liquid, or to remove the dust from the gases by means of a liquid or to set up chemical reactions. Operations of this kind are at present carried out in the chemical industry and in the purification of waste water.

Belgian Pat. No. 772,546 describes a device suitable for this latter purpose. It consists of fan blades situated in an air box, the latter being mounted above a tulip-shaped pipe immersed in the liquid to be treated, which is carried along with the blades.

The construction of this device has been found comparatively complicated. The manufacture of the air box, in particular, involves operations of the boiler-making type, thus increasing the cost. Furthermore, the friction exerted by the flared descending pipe on the liquid i.a. reduces the performance rate of the apparatus.

U.S. Pat. No. 2,054,395 likewise describes a device used for the purification of water, in which device a liquid fed by a pipe is centrifuged by the blades of a propellor. This device provides for no intake of air into the centrifuge.

OBJECTS AND SUMMARY OF THE INVENTION

The present invention is intended to simplify the shape and the actual design of a device enabling mixtures of gases and liquids to be obtained. An additional purpose of the invention is to increase the efficiency achieved in the aforementioned operation.

The device to which the invention relates is characterized by the fact that it comprises a fan stage rotated by a motor situated above a distribution stage which is rotatably driven as a result of the fact that it is connected to the fan stage and formed by at least one plate which is designed to be moved close to the level of the liquid to be treated and which is provided with a central aperture through which the said liquid is sucked in by the action of the fan unit and mixed with the gas fed in between the fan stage and the distribution stage.

The fan stage may consist of one or more plates of any desired shape, fitted with blades. Such plates are very simple to construct, particularly by the stamping process. The blades can be either obtained by a stamping operation or be welded onto the plates. They can also be produced by the casting process.

Under the effect of the fan stage, for which a suitable speed, according to the invention, is 1000 to 1500 r.p.m., in the absence of any casing for the device, the liquid is taken in by suction through the central aperture of the distribution stage, forming a spray jet of which the magnitude can be regulated by the selection of suitable dimensions for the aperture.

The distribution stage, being integral with the fan stage, causes the liquid thus taken in by suction to be centrifuged and vaporized. It then falls onto the distribution stage, in the form of fine drops of liquid mixed with the gases sucked in through the central aperture of the fan stage.

In general, the distribution stage is produced by a stamping and cutting-off process and consists of at least one plate, either flat or having slightly raised edges and thus a shape approaching that of a dish. In the latter case its concavity may, in particular, be situated on the opposite side to the liquid and include a slight recess, so that the base is immersed in the liquid while the raised edges are situated above the level of the liquid. Whatever shape is adopted for the plate or plates of the distribution stage, it is also possible to affix a descending pipe on the periphery of the central aperture, forming a prolongation for the lower plate of the unit and immersed in the liquid. This makes it possible to reduce the effects of the friction of the water, if the plate is raised above the level of the liquid, and to increase the operating efficiency of the apparatus. This pipe may itself be caused to accompany the movement of the lower plate of the distribution stage, but it is of advantage, in order to reduce the friction, to keep the immersion pipe in a fixed (not rotating) position and to connect it to the plate by means of a swivel joint, such as a labyrinth seal, for example.

The fan stage and the distribution stage can with advantage be rendered integral with each other by means of rods or screwthreaded tubes which enable the distance between these two units to be adjusted.

It is also possible to provide a plate without an aperture, by way of a baffle between the fan stage and the distribution stage.

Needless to say, there are numerous constructional parameters which can be selected in accordance with the nature of the products to be treated, the particular effect to be obtained and the operating conditions prevailing. For example, a suitable ratio between the dimensions of the plates and of the central aperture, in conjunction with the depression effect created by the fan stage (obviously depending on its shape and on the speed at which it is driven), enables a suitable mixture of gas and liquids to be produced. A person skilled in the art will have no difficulty in adapting the device by varying these factors as required. The purpose of the invention can generally be achieved with one single plate for each of the two stages.

The apparatus used at the present time practically always consists of a set of blades serving to stir the water at low speeds of rotation, necessitating the use of a reduction gear. The device to which the invention relates, on the other hand, enables the fan unit to be driven directly, i.e., without recourse to a reduction gear, at the speeds usual for electric motors (1000–1500 r.p.m.) without thereby destroying the bacteria, as is often found to occur when the water to be treated is stirred overvigorously.

By "gas" in the present description are meant not only the true gases but also vapours, fog or gases containing dust in suspension etc.

By "liquids" are meant not only pure liquids but also mixtures of liquids, whether miscible or not, as well as liquids containing suspended solids, sludge, emulsions etc.

To enable the invention to be understood more clearly, it will be of advantage to refer to the schematic diagram of various possible constructional embodiments of the device to which the invention relates. Identical or similar components have been given the same reference numbers in the different diagrams.

BRIEF DESCRIPTION OF THE DRAWINGS

The drawings are as follows:

FIGS. 3 to 5 are side elevations providing schematic diagrams of preferred embodiments in accordance with the invention.

DETAILED DESCRIPTION OF PREFERRED EMBODIMENTS

The device will be described as functioning in the atmosphere on the surface of a liquid, the gas in question thus being air.

Figure 1:
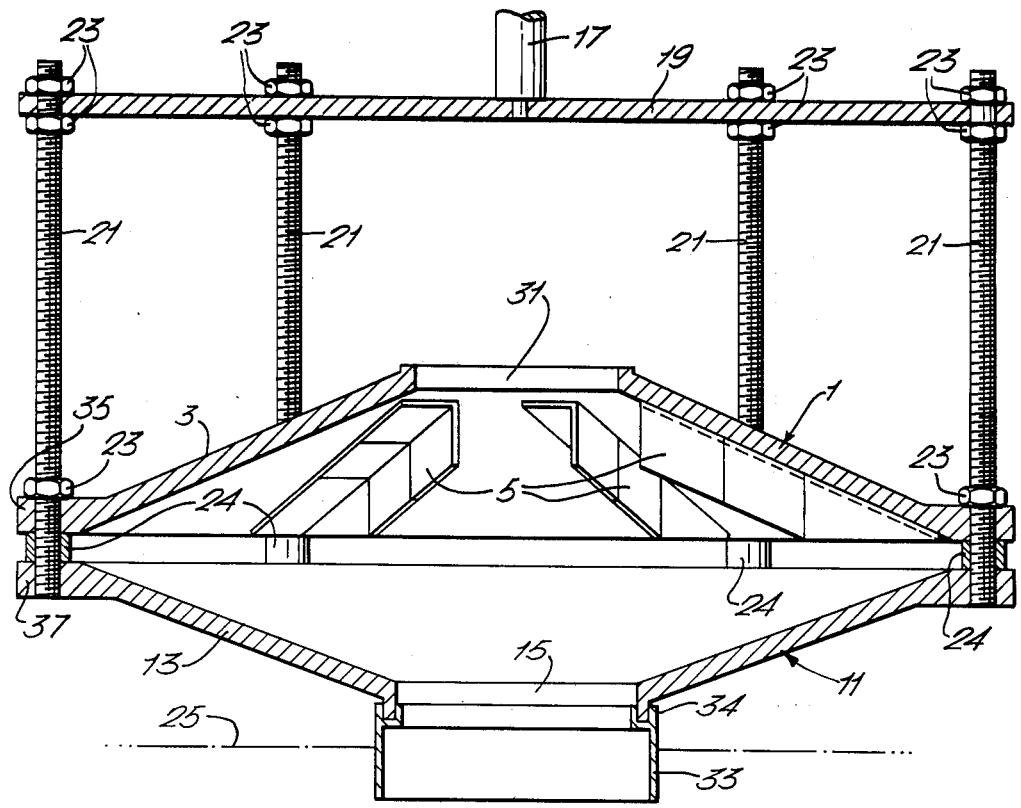
FIG. 1 is an elevation of a device according to the invention.
Figure 2:
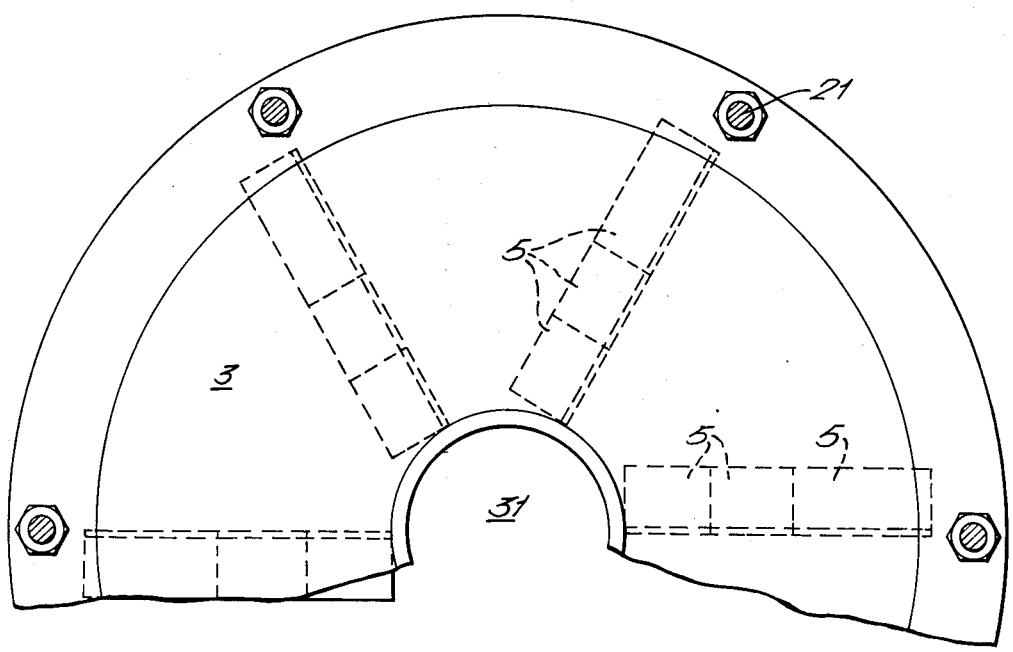
FIG. 2 is a partial plan view of the upper plate 1 of FIG. 1.

In FIGS. 1 and 2, the reference number 1 indicates the fan stage formed by a plate 3 of dish shape, having a central air intake aperture 31 and fitted with blades 5.

The distribution stage 11 consists of a plate 13 of dish shape, provided with a central aperture 15, which in one particular embodiment of the invention has a lower prolongation taking the form of a pipe 33. A shaft 17 drives both stage 1 and stage 11 via a mounting plate 19 and rods 21. These rods may with advantage consist of screw-threaded tubes fitted with nuts 23 and spacers 24, in order to enable the distance between stages 1 and 11 to be regulated.

In the diagram the pipe 33 occupies a fixed (ie. not rotating) position in relation to the rotary plate 13. A labyrinth seal 34 is provided for this purpose.

The pipe 33 and possibly even the base of the plate 13 are immersed in the liquid reaching at rest, the level shown by the strokes 25, the edge 17 of the plate being thus situated above the level of the liquid. Under the effect of the rotation of the device thus designed, air is taken in by suction through the aperture 31, while the liquid is sucked in through the aperture 15, where it undergoes a centrifuging process and is expelled in the form of a mixture of liquid and air stirred by the fan stage.

The expulsion of the mixture of liquid sucked in through the pipe 33 and air arriving through the aperture 31 is effected between the peripheral lips 35 and 37 of the two plates 3 and 13.

This embodiment of the invention offers particular advantages by reason of its high performance rates.

By regulating the height of the device in relation to the level of the liquid, a considerable variety of effects can be obtained. If the pipe 33 is immersed to a considerable distance, the delivery of liquid is likewise considerable. The greater the height to which the device is lifted, the finer the spraying, i.e., particle size of the liquid and thus the more satisfactory the mixture with the air. In the case of a device such as that shown, with a diameter of about 30 cm and with a distance of the order of 8 mm between the lips 35 and 37, the device can be raised in such a way that the bottom end of the pipe is up to 10 or 15 cm from the level of the water at rest. It can be seen in this latter case that the water taken in by suction is caused to move in a spiral trajectory, a waterspout thus being produced. The water may also be seen to perform a gyratory motion of which the axis is that of the pipe 33.

This makes it possible to separate a supernatant liquid, such as supernatant oil on water on the surface of a basin.

The device shown in FIG. 3 differs from that shown in FIGS. 1 and 2 by the absence of the immersion pipe 33 and the presence of a baffle 40, separating stages 1 and 11 and caused to accompany their movement. The air sucked in through the aperture 31 and expelled at the periphery (at 35) causes a depression by the Venturi effect and takes in water through the aperture 15, this water being likewise expelled at the periphery as a spray (at 37), in which process it is mixed with the air.

The device shown in FIG. 4 differs from the previous versions in that the plate forming the stage 11 has a concavity facing towards the liquid.

In the device shown in FIG. 5 the two plates 3 and 13 are flat.

For devices in accordance with the invention there are numerous applications, among which mention may be made of the aeration of waste water, humidifiers, dust-removal installations, apparatus for the reaction of liquids with gases, refrigeration devices, and mixers of all kinds.

Although a description has been given of certain applications envisaged and of particular embodiments of the device to which the ivnention relates, it must be borne in mind that the latter is by no means confined to the said examples and that numerous variants can be adopted without thereby departing from the scope of the invention.

In particular, for example, it would be possible to employ a fan 3 which, instead of comprising a central aperture 31, is made from a solid plate, i.e., from one having no central aperture, its blades 5 being formed by a shaping process, leaving an aperture of the shape and dimensions of the blades in the plate, on a level with the blades, thus giving passage to gas.

In all cases, however, the stage 1 must function in the manner described, i.e., liquid must be taken in by suction through the central aperture 15 and mixed with the gas (i.e. air) circulating between stages 1 and 11, under the effect of stage 1.

It is possible, in particular, by regulating various constructional factors as required, to control the quantity of gas and of liquid respectively, with a view to obtaining the optimum effect for the purpose concerned.

What is claimed is:

1. A device for mixing a liquid with a gas having a liquid level defined therebetween, comprising an upper substantially horizontally extending plate having an upper face, a lower face and a periphery; impeller blades mounted on said upper plate lower face; a central gas intake opening provided in said upper plate; said blades being adapted to suck in gas from said upper plate gas intake opening and to impel it towards the periphery of said upper plate; means for rotating said upper plate; a lower substantially horizontally extending plate having a central liquid sucking aperture and a periphery; said lower plate being coaxial with said upper plate; means for fixedly connecting said upper plate and said lower plate at a distance one from the other, said upper and lower plates thus rotating in unison, a peripheral gap being thus defined between the periphery of said upper and lower plates, said impeller blades being spaced above said gap; and means for supporting said upper and lower plates with said gap being maintained above the liquid level.

2. The device according to claim 1, wherein said upper and lower plates are rotated at a speed ranging from 1000 to 1500 r.p.m.

3. The device according to claim 2, wherein said means for connecting said upper and lower plates comprises nuts and threaded rods; and said lower plate is concavely shaped having raised edges, the concavity is on the opposite side relative to the liquid, said raised edges being situated above the level of the liquid; said lower plate further comprises a pipe extending downwards from and coaxially connected to and rotationally isolated from said central aperture, said pipe having the same diameter as said central aperture and being immersed in said liquid.

4. The device according to claim 1, wherein said means for fixedly connecting and said means for supporting comprise a mounting plate coaxially arranged above said upper and lower plates at a distance therefrom, connecting threaded rods extending between said mounting plate and said upper and lower plates, nuts threadably engaged with said threaded rods to make integral said mounting plate and said upper and lower plates, spacer means being arranged between said upper and lower plates periphery to adjust said peripheral gap and said means for rotating being mounted on said mounting plate.

5. The device according to claim 4 wherein said lower plate further comprises a pipe extending downwards from and rotatably connected thereto around said liquid intake aperture.

6. The device according to claim 1 wherein said means for rotating comprises a shaft and an electric motor with said shaft being directly coupled with said motor.

7. The device according to claim 6 further comprising a baffle interposed between said upper and lower plates below said impeller blades.

8. The device according to claim 1 further comprising a baffle interposed between said upper and lower plates below said impeller blades.

9. The device according to claim 1, wherein said lower plate is concavely shaped having raised edges, the concavity is on the opposite side relative to the liquid and said raised edges are situated above the level of the liquid.

10. The device according to claim 1, wherein said lower plate is concavely shaped and the concavity faces towards the liquid.

11. The device according to claim 1, wherein said lower plate and said upper plate are concavely shaped and the concavity of said lower plate faces the concavity of said upper plate.

12. The device according to claim 1, wherein said lower plate further comprises a pipe extending downwards from and co-axially connected with said central aperture, said pipe having the same diameter of said central aperture and being immersed in said liquid.

13. The device according to claim 12, wherein said pipe is rotationally isolated from said lower plate.

14. The device according to claim 1, wherein said means for connecting said upper and lower plates comprises threaded rods and nuts whereby the distance between said upper and lower plates can be adjusted.

* * * * *